United States Patent
Fukuda et al.

(10) Patent No.: US 8,371,759 B2
(45) Date of Patent: Feb. 12, 2013

(54) DOUBLE ROW ROLLING BEARING FOR SUPPORTING PINION SHAFT AND ROLLING BEARING APPARATUS PROVIDED WITH THE SAME

(75) Inventors: Toshirou Fukuda, Nara (JP); Yuzuru Takahashi, Kashiwara (JP); Toshihiro Kawaguchi, Nara (JP); Hiroyuki Ooshima, Kashihara (JP); Kiyokane Iwamoto, Higashiosaka (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 1168 days.

(21) Appl. No.: 12/225,923

(22) PCT Filed: Apr. 2, 2007

(86) PCT No.: PCT/JP2007/057418
§ 371 (c)(1),
(2), (4) Date: Oct. 2, 2008

(87) PCT Pub. No.: WO2007/116869
PCT Pub. Date: Oct. 18, 2007

(65) Prior Publication Data
US 2010/0202721 A1    Aug. 12, 2010

(30) Foreign Application Priority Data
Apr. 3, 2006   (JP) ................. 2006-102212

(51) Int. Cl.
*F16C 19/08* (2006.01)
*F16C 43/06* (2006.01)
*F16C 33/38* (2006.01)

(52) U.S. Cl. ........ 384/512; 384/504; 384/523; 384/559; 384/560; 29/898.06

(58) Field of Classification Search ............... 384/504, 384/510, 512, 523, 540, 548, 559–560; 29/898.04–898.041, 898.06, 898.067
See application file for complete search history.

(56) References Cited

U.S. PATENT DOCUMENTS

| | | | | |
|---|---|---|---|---|
| 1,325,113 | A * | 12/1919 | Rohn | 384/512 |
| 1,643,982 | A * | 10/1927 | Delaval-Crow | 384/524 |
| 3,792,625 | A * | 2/1974 | Asberg | 74/424 |
| 4,136,916 | A * | 1/1979 | Musselman et al. | 384/560 |
| 4,722,617 | A * | 2/1988 | Stella et al. | 384/526 |
| 6,386,764 | B1 * | 5/2002 | Moore et al. | 384/523 |
| 6,957,919 | B2 * | 10/2005 | Kern et al. | 384/512 |
| 7,059,777 | B2 * | 6/2006 | Kawaguchi et al. | 384/512 |
| 7,524,116 | B2 * | 4/2009 | Haepp | 384/526 |

FOREIGN PATENT DOCUMENTS

| | | |
|---|---|---|
| JP | 9-105450 | 4/1997 |
| JP | 10-220468 | 8/1998 |
| JP | 2004-190728 | 7/2004 |
| JP | 2005-233334 | 9/2005 |
| JP | 2005-233406 | 9/2005 |

* cited by examiner

*Primary Examiner* — Marcus Charles
(74) *Attorney, Agent, or Firm* — McGinn IP Law Group, PLLC

(57) ABSTRACT

In a double row rolling bearing for supporting a pinion shaft, an outer ring is fixed to an inner peripheral surface of an annular wall (case) with its axis disposed horizontally, and an inner ring assembly is fitted on a pinion shaft, and is inserted, together with the pinion shaft, horizontally into the outer ring through a larger-diameter opening of the outer ring, and is mounted in the outer ring. A larger-diameter cage has a drop limitation portion for limiting the vertically-downward movement of the larger-diameter case.

12 Claims, 14 Drawing Sheets

DOUBLE ROW ROLLING BEARING FOR SUPPORTING PINION SHAFT AND ROLLING BEARING APPARATUS PROVIDED WITH THE SAME

This is an application of PCT/JP2007/057418 filed on Apr. 2, 2007, which claims priority from Japanese Patent Application No. 2006-102212 filed on Apr. 3, 2006, the content of which is incorporated herein by reference.

TECHNICAL FIELD

This invention relates to a double row rolling bearing for supporting a pinion shaft, used as at least one of two bearings rotatably supporting two axially-spaced portions of the pinion shaft incorporated in a power transmitting apparatus (such as an automotive differential gear and a transfer apparatus for a four-wheel drive vehicle) for transmitting a driving force of an engine, and the invention relates also to a rolling bearing apparatus provided with this double row rolling bearing.

BACKGROUND ART

In an automotive differential gear and a transfer apparatus for a four-wheel drive vehicle, it has heretofore been proposed to use a construction in which tapered roller bearings are provided respectively at a pinion gear-side portion (one axial end portion) of a pinion shaft and an anti-pinion-gear-side portion (the other axial end portion) of the pinion shaft, and the pinion shaft is rotatably supported on an inner peripheral surface of a case by the two tapered roller bearings (see Patent Literatures 1 and 2).

However, in this pinion shaft-supporting construction, a radial load and a thrust load simultaneously act on the pinion gear-side tapered roller bearing, and besides the proportion of the thrust load is high, and therefore this tapered roller bearing has a large contact angle.

Therefore, a large frictional resistance acts on this tapered roller bearing, so that a running torque becomes large, and as a result the efficiency of the differential gear tends to be lowered.

Therefore, there has been proposed a pinion shaft-supporting bearing apparatus in which instead of a tapered roller bearing, a double row rolling bearing is used as a pinion gear-side bearing supporting a pinion shaft (see Patent Literature 3).

A differential gear, in which a pinion gear-side portion (free end portion) of a pinion shaft is supported on an inner peripheral surface of a case by this double row rolling bearing, will be described with reference to FIG. 11.

The differential gear 1 includes the differential case 2. The differential case 2 comprises a front case 3 and a rear case 4, and the two cases 3 and 4 are joined together by bolt/nut arrangements 2a.

Bearing-mounting annular walls 27A and 27B are formed within the front case 3. The differential case 2 contains a differential speed change mechanism 5 interlocking right and left wheels in a differential manner, and the pinion shaft 7 having a pinion gear 6.

The pinion gear 6 is in mesh with a ring gear 8 of the differential speed change mechanism 5.

A shaft portion 9 of the pinion shaft 7 is stepped to increase in diameter toward the pinion gear 6. A pinion gear-side portion of the shaft portion 9 of the pinion shaft 7 is rotatably supported on the annular wall 27A of the front case 3 through the double row rolling bearing 10.

An anti-pinion-gear-side portion (remote from the pinion gear 6) of the shaft portion 9 of the pinion shaft 7 is rotatably supported on the annular wall 27B of the front case 3 through a double row rolling bearing 25.

The front case 3 has an oil circulating passageway 40 formed between its outer wall and the annular wall 27A, and an oil inlet 41 of the oil circulating passageway 40 is open toward the ring gear 8, and an oil outlet 42 of the oil circulating passageway 40 is open to a region between the annular walls 27A and 27B.

A closure plate 37 is inserted into the front case 3 through a smaller-diameter opening thereof, and is fitted on the shaft portion 9 of the pinion shaft 7.

A barrel portion 44 of a companion flange 43 is spline-fitted on the shaft portion 9, and an end surface of this barrel portion 44 is held against the closure plate 37. An oil seal 46 is mounted on the barrel portion 44 of the companion flange 43.

A seal protection cup 47 is attached to the smaller-diameter opening portion of the front case 3.

A nut 49 is threaded on a threaded portion 48 of the shaft portion 9, thereby imparting a predetermined preload to rows 17 and 18 of rolling elements of the double row rolling bearing 10 and rows 32 and 33 of the double row rolling bearing 25.

In the above construction, the nut 49 is threaded on the threaded portion 48, so that an inner ring 13 of the double row rolling bearing 10 and an inner ring 14 of the double row rolling bearing 25 are held between an end face of the pinion gear 6 and an end surface of the companion flange 43 in the axial direction, thereby imparting the predetermined preload to the rows 17 and 18 of rolling elements of the double row rolling bearing 10 and the rows 32 and 33 of rolling elements of the double row rolling bearing 25 through the closure plate 37 and a plastic spacer 23.

Here, the double row rolling bearing 10 and the double row rolling bearing 25 are provided respectively on at least two axially-spaced portions, that is, the pinion gear-side portion and the anti-pinion-gear-side portion of the pinion shaft 7, and jointly form a rolling bearing apparatus supporting the pinion shaft 7 on the annular walls 27A and 27B each serving as the inner peripheral surface of the case.

The conventional double row rolling bearing 10 will now be described with reference to FIG. 12. This double row rolling bearing 10 is a double row angular contact ball bearing, and comprises an outer ring 11 having a larger-diameter raceway 11a and a smaller-diameter raceway 11b which are arranged in two rows in the axial direction, the inner ring 13 having a larger-diameter raceway 13a and a smaller-diameter raceway 13b which are arranged in two rows in the axial direction and are opposed respectively to the larger-diameter raceway 11a and the smaller-diameter raceway 11b in the radial direction, the larger-diameter row 17 of rolling elements disposed between the larger-diameter raceways 11a and 13a, the smaller-diameter row 18 of rolling elements disposed between the smaller-diameter raceways 11b and 13b, a larger-diameter cage 19 holding the larger-diameter row 17 of rolling elements, and a smaller-diameter cage 20 holding the smaller-diameter row 18 of rolling elements.

In this double row rolling bearing 10, the inclinations of contact angles of the larger-diameter and smaller-diameter rows 17 and 18 of rolling elements for the respective raceways (11a and 13a) and (11b and 13b) are in the same direction.

Among the bearing parts of the double row rolling bearing 10, the inner ring 13, the rows 17 and 18 of rolling elements and the cages 19 and 20 are assembled together to form an inner ring assembly 21, and this inner ring assembly 21 is inserted into the outer ring 11 through a larger-diameter opening thereof to be mounted therein.

Namely, the outer ring 11 is fixed to an inner peripheral surface of the annular wall 27A with its axis disposed horizontally. The inner ring assembly 21 is fitted on the pinion shaft 7. The pinion shaft 7 having the inner ring assembly 21 fitted thereon is inserted horizontally into the larger-diameter opening of the outer ring 11, thereby assembling the outer ring 11 and the inner ring assembly 21 together in the horizontal direction. By doing so, the pinion gear-side portion of the pinion shaft 7 can be supported on the annular wall 27A through the double row rolling bearing 10.

However, the double row rolling bearing 10 of the above construction has the following problems.

These problems will be described with reference to FIGS. 13 and 14. In the drawings, the upward-downward direction is defined as the vertical direction, and the right-left direction is defined as the horizontal direction. The outer ring 11, the pinion shaft 7 and the inner ring 13 of the inner ring assembly 21 have their respective axes 31 coinciding with one another. FIG. 13 shows a condition before the inner ring assembly 21 is mounted in the outer ring 11. The outer ring 11 is mounted on the inner peripheral surface of the annular wall 27A (that is, the inner peripheral surface of the case) with its axis disposed horizontally. On the other hand, the inner ring assembly 21 is fitted on the pinion shaft 7. The distance from the axis 31 of the outer ring 11 to a vertically-lower portion of an inner peripheral edge 11c of the larger-diameter opening of the outer ring 11 is represented by D0.

In the inner ring assembly 21, the rows 17 and 18 of rolling elements are circumferentially disposed on the raceways 13a and 13b of the inner ring 13, respectively, and are held by the cages 19 and 20, respectively.

In this condition, any load, that is, any external force, acts on the rows 17 and 18 of rolling elements. A radial clearance exists between the row 17 of rolling elements and the raceway 13a of the inner ring 13, and also a radial clearance exists between the row 18 of rolling elements and the raceway 13b of the inner ring 13. Therefore, each of the rolling element rows 17 and 18 moves in a direction to reduce the vertically-upper radial clearance because of the deadweight, so that the vertically-lower radial clearance increases.

Namely, the rolling element row 17 as well as the rolling element row 18 drops downward in an amount corresponding to the radial clearance. As a result, the vertical distance D1 from the axis 31 to a vertically-lowermost end of the larger-diameter row 17 of rolling elements often becomes larger as compared with the vertical distance D0 from the axis 31 of the outer ring 31 to the vertically-lower portion of the inner peripheral edge 11c of the larger-diameter opening of the outer ring 11.

In the case where this distance relation is established, the larger-diameter row 17 of rolling elements are caused to abut against the inner peripheral edge portion 11c of the larger-diameter opening of the outer ring 11 when the pinion shaft 7 is inserted into the outer ring 11 through the larger-diameter opening thereof as shown in FIG. 14.

The inner peripheral edge 11c of the larger-diameter opening of the outer ring 11 has a generally right-angled corner-shape, and therefore when the speed of mounting (or inserting) of the pinion shaft 7 into the larger-diameter opening of the outer ring 11 is high, or when this mounting force is high, there is a possibility that the rolling elements forming the rolling element row 17 are easily damaged at their surfaces by the inner peripheral edge 11c of the larger-diameter opening of the outer ring 11.

And besides, when those rolling elements of the rolling element row 17 which have been damaged at their surfaces roll on the raceway 13a of the inner ring 13 at high speed, a large vibration and sound are produced, and also the raceway 13a of the inner ring 13 is subjected to damage such as flaking, etc., which invites a shortened life of the double row rolling bearing 10 at a premature stage.

Patent Literature 1: JP-A-9-105450 Publication
Patent Literature 2: JP-A-10-220468 Publication.
Patent Literature 3: JP-A-2004-190728 Publication

DISCLOSURE OF THE INVENTION

Problem that the Invention is to Solve

Therefore, the problem that this invention is to solve is to provide a construction in which the dropping of the larger-diameter row of rolling elements is limited so as to prevent the rolling elements from abutting against the inner peripheral edge of the larger-diameter opening of the outer ring at the time when the inner ring assembly is inserted into the outer ring through the larger-diameter opening thereof to be mounted in the outer ring.

Means for Solving the Problem

According to the present invention, there is provided a double row rolling bearing for supporting a pinion shaft wherein an outer ring is fixed to an inner peripheral surface of a case with its axis disposed horizontally, and an inner ring assembly is fitted on a pinion shaft, and is inserted, together with the pinion shaft, horizontally into the outer ring through a larger-diameter opening of the outer ring, and is mounted in the outer ring; characterized in that the outer ring has a larger-diameter raceway and a smaller-diameter raceway which are formed in two rows on an inner peripheral surface thereof; and the inner ring assembly comprises an inner ring having a larger-diameter raceway and a smaller-diameter raceway which are formed in two rows on an outer peripheral surface thereof and are opposed respectively to the larger-diameter and smaller-diameter raceways of the outer ring in a radial direction, a larger-diameter row of rolling elements disposed between the larger-diameter raceways, a smaller-diameter row of rolling elements disposed between the smaller-diameter raceways, a larger-diameter cage holding the larger-diameter row of rolling elements, and a smaller-diameter cage holding the smaller-diameter row of rolling elements; and the larger-diameter cage has a flange-like drop limitation portion extending radially inwardly from an axially-inner end portion thereof, and the drop limitation portion prevents the larger-diameter row of rolling elements from dropping in an amount exceeding a predetermined value.

The double row rolling bearing may be provided at the pinion gear-side portion of the pinion shaft or may be provided at each of the pinion gear-side and anti-pinion-gear-side portions of the pinion shaft.

In the invention, there is provided the drop limitation portion, and therefore the inner ring assembly can be inserted into the outer ring through the larger-diameter opening thereof to be mounted therein without causing the larger-diameter row of rolling elements to abut against an inner peripheral edge of the larger-diameter opening of the outer ring.

As a result, in the above mounting operation, the rolling elements will not be damaged by the inner peripheral edge of the larger-diameter opening of the outer ring, and therefore a large rolling sound will not be generated, and also a larger-diameter raceway of the inner ring will not be subjected to damage such as flaking, etc., thereby achieving a long life of the double row rolling bearing.

According to another aspect of the invention, there is provided a rolling bearing apparatus wherein a pinion shaft having a pinion gear fixed to its free end portion is supported on an inner peripheral surface of a case of a differential gear, a transfer apparatus or the like of an automobile by at least two bearings disposed respectively at a pinion gear-side portion and an anti-pinion-gear-side portion of the pinion shaft which are spaced from each other in an axial direction; characterized in that the pinion gear-side bearing is the above-mentioned double row rolling bearing, and the outer ring of the double row rolling bearing is fixed to the inner peripheral surface of the case with its larger-diameter opening directed toward the pinion gear, and the inner ring assembly is inserted into the outer ring through the larger-diameter opening thereof to be mounted in the outer ring.

Advantage of the Invention

In the present invention, the outer ring is fixed to the inner peripheral surface of the case with its axis disposed horizontally, and the inner ring assembly is fitted on the pinion shaft, and is inserted, together with the pinion shaft, horizontally into the outer ring through the larger-diameter opening of the outer ring, and is mounted in the outer ring. In this mounting operation, the dropping of the larger-diameter row of rolling elements downward in the vertical direction is limited by the drop limitation portion, so that the inner ring assembly can be mounted in the outer ring without causing the rolling elements to abut against the inner peripheral edge of the larger-diameter opening of the outer ring.

BEST MODE FOR CARRYING OUT THE INVENTION

Figure 1:
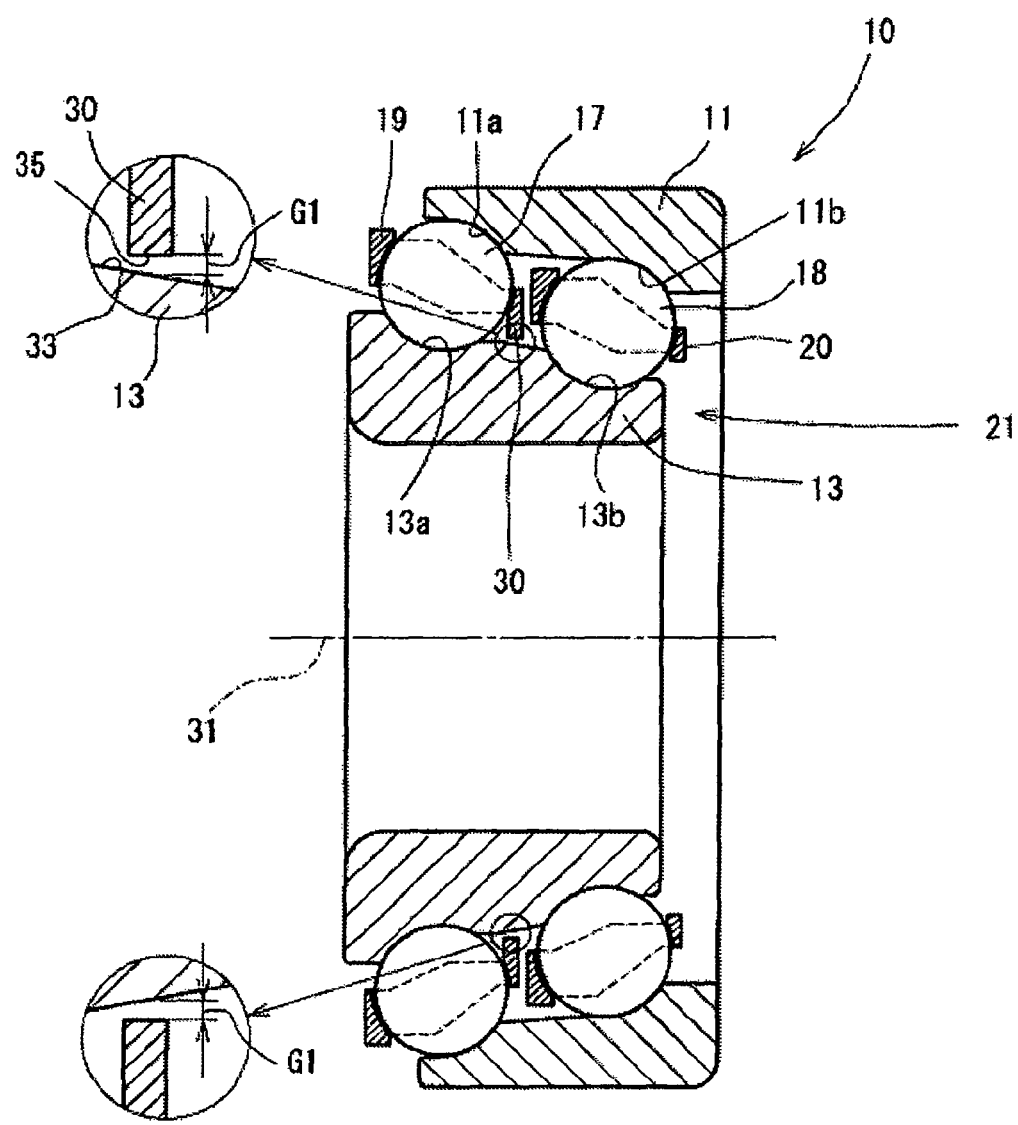
FIG. 1 is a cross-sectional view of a preferred embodiment of a double row rolling bearing of the present invention.

A preferred embodiment of a double row rolling bearing of the present invention will now be described with reference to the accompanying drawings. In FIG. 1, those portions similar to those of the above-mentioned conventional example will be designated by identical reference numerals, respectively, and description thereof will be omitted.

In the double row rolling bearing 10 of this embodiment, an outer ring 11 is fixed to an inner peripheral surface of an annular wall 27A with its axis disposed horizontally. An inner ring assembly 21 is fitted on a pinion shaft 7, and is inserted horizontally, together with the pinion shaft 7, into a larger-diameter opening of the outer ring 11, and is mounted in the outer ring 11.

In this double row rolling bearing 10, an axially-inner end of a larger-diameter cage 19 of the inner ring assembly 21 is extended radially inwardly to form an annular flange portion serving as a drop limitation portion 30. In the process of mounting the inner ring assembly 21 in the outer ring 11, this flange portion (the drop limitation portion 30) is caused to abut against an outer peripheral surface of the inner ring 13 to limit the dropping of the larger-diameter cage 19 downward in a vertical direction, thereby preventing a radial clearance at a vertically-upper side of a larger-diameter row 17 of rolling elements from becoming smaller than a predetermined value. This drop limitation portion 30 may be formed integrally with the large-diameter cage 19 or may be formed separately from the cage 19. A generally uniform clearance G1 exists between an inner peripheral surface 35 of the drop limitation portion 30 and the outer peripheral surface 33 of the inner ring 13 in the vertical direction.

Figure 2:
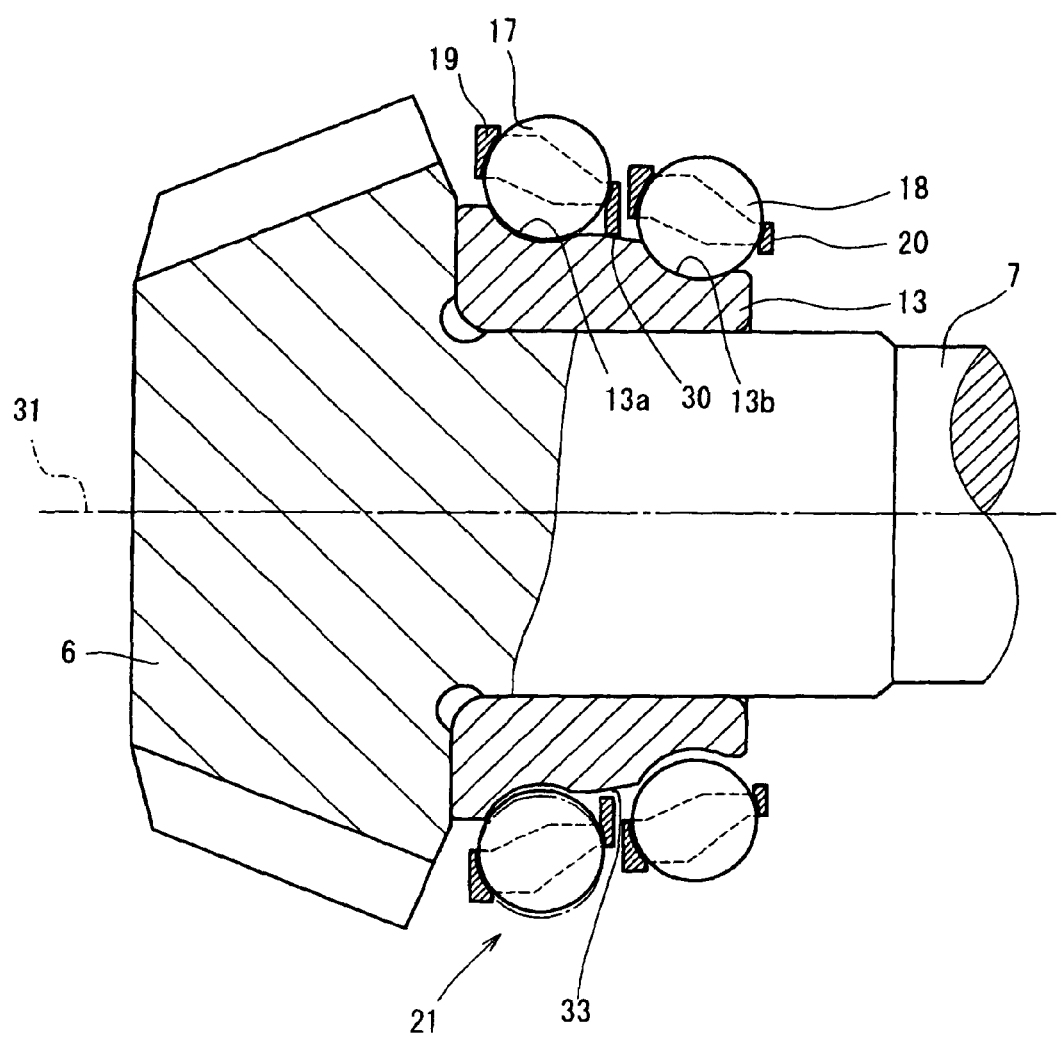
FIG. 2 is a cross-sectional view showing a condition in which an inner ring assembly of the double row rolling bearing is fitted on a pinion shaft, and an outer ring of the double row rolling bearing is fixed to an annular wall.

The drop limitation portion 30 will be described with reference to FIG. 2. FIG. 2 shows a condition in which the inner ring assembly 21 is merely fitted on the pinion shaft 7, and is not yet mounted in the outer ring 11. For better understanding of the drop limitation effect by the drop limitation portion 30, an imaginary line indicates a dropped condition obtained when the drop limitation portion 30 is not provided.

A smaller-diameter cage 20 of the inner ring assembly 21 is not provided with such drop limitation portion 30, and therefore this cage 20, together with a smaller-diameter row 18 of rolling elements, drop downward in the vertical direction by an amount equal to a radial clearance, and the radial clearance is eliminated at a vertically-upper side of the smaller-diameter row 18 of rolling elements, so that the radial clearance at a vertically-lower side increases.

On the other hand, although the larger-diameter cage 19 of the inner ring assembly 21 also drops in the vertical direction, the inner peripheral surface of the vertically-upper portion of the drop limitation portion 30 of the cage 19 abuts against the outer peripheral surface of the vertically-upper portion of the inner ring 13. Therefore, the amount of dropping of the larger-diameter cage 19 downward in the vertical direction is reduced by a limitation length (i.e., a height or radial dimension) of the drop limitation portion 30 as compared with the case where the drop limitation portion 30 is not provided as indicated by the imaginary line.

The limitation length of the drop limitation portion 30 is so determined as to satisfy a formula, $D1 \leq D0$, where D0 represents the distance (first distance) from the axis 31 of the outer ring 11 to a vertically-lower portion of an inner peripheral edge 11c of the larger-diameter opening of the outer ring 11, and D1 represents the distance (second distance) from the axis 31 to a vertically-lower end of the larger-diameter row 17 of rolling elements.

By thus determining the limitation length, the inner ring assembly 21 can be inserted horizontally into the outer ring 11 through the larger-diameter opening thereof to be mounted in the outer ring 11 without causing the larger-diameter row 17 of rolling elements to abut against the inner peripheral edge 11c of the larger-diameter opening of the outer ring 11 at their vertically-lower portions.

The limitation length of the drop limitation portion 30 and the above formula will be described with reference to FIGS. 3 to 5 in connection with the description of the process of mounting the inner ring assembly 21 (fitted on the pinion shaft 7) in the outer ring 11 through the larger-diameter opening thereof.

Figure 3:
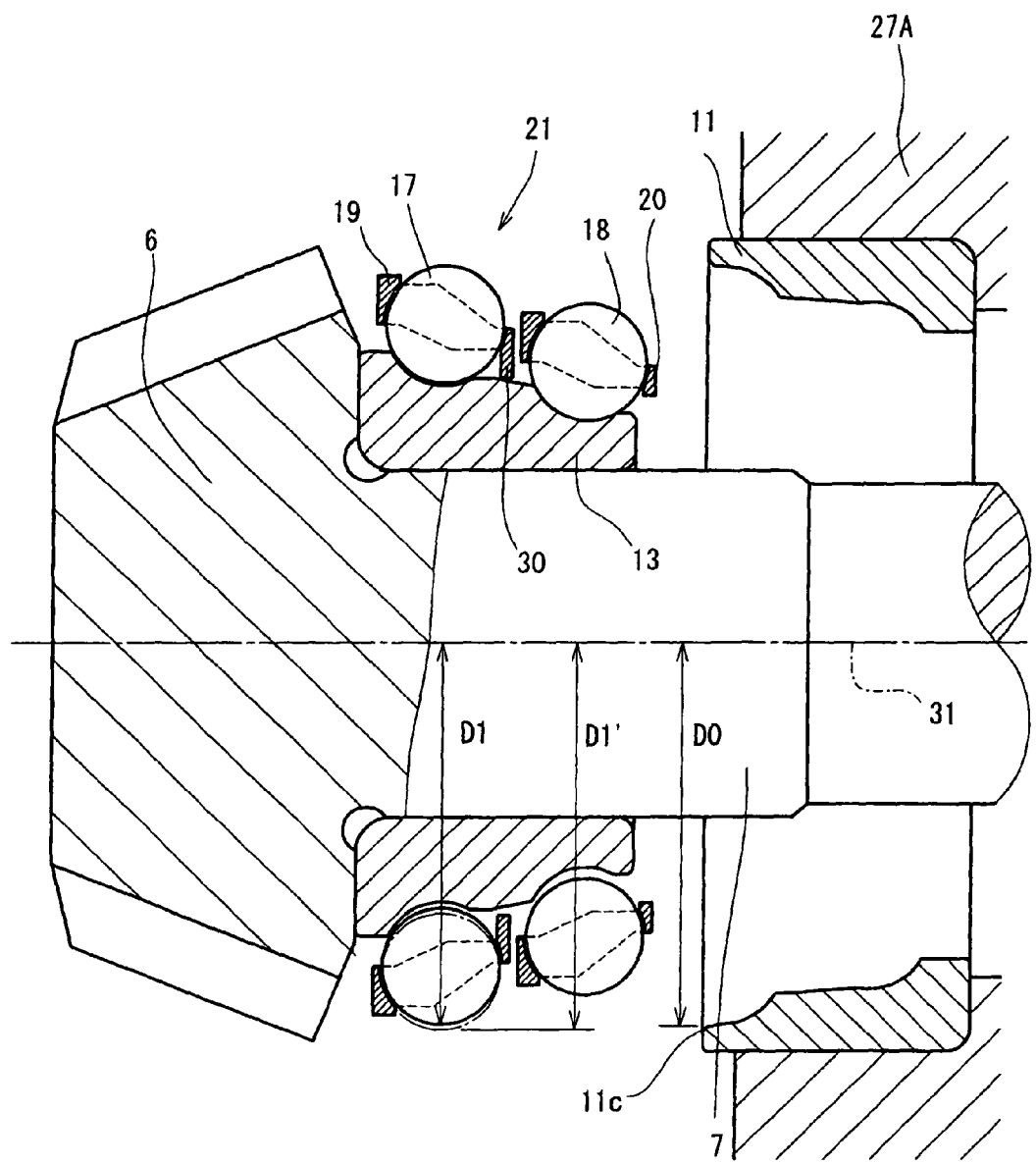
FIG. 3 is a cross-sectional view showing a condition before the inner ring assembly is mounted in the outer ring.

As shown in FIG. 3, the inner ring assembly 21 is fitted on the pinion shaft 7. The outer ring 11 is fixed to the inner peripheral surface of the annular wall 27A. The axes 31 of the outer ring 11, the pinion shaft 7 and the inner ring 13 of the inner ring assembly 21 coincide with one another in the horizontal direction.

As described above, the length of the drop limitation portion 30 is so determined as to satisfy the formula, $D1 \leq D0$, where D0 represents the distance (first distance) from the axis 31 of the outer ring 11 to the vertically-lower portion of the inner peripheral edge 11c of the larger-diameter opening of the outer ring 11, and D1 represents the distance (second distance) from the axis 31 to the vertically-lowermost end of the larger-diameter row 17 of rolling elements. Therefore, even when the larger-diameter cage 19 is moved downward in the vertical direction because of its deadweight and the deadweight of the row 17 of rolling elements, this movement is limited by the drop limitation portion 30 designed to satisfy the formula, $D1 \leq D0$. Incidentally, in the case where the drop limitation portion 30 is not provided, the larger-diameter cage 19 drops in a larger amount as indicated in an imaginary line, so that the distance from the axis 31 to the vertically-lowermost end of the larger-diameter row 17 of rolling elements is represented by $D1'$ ($>D0$).

Figure 4:
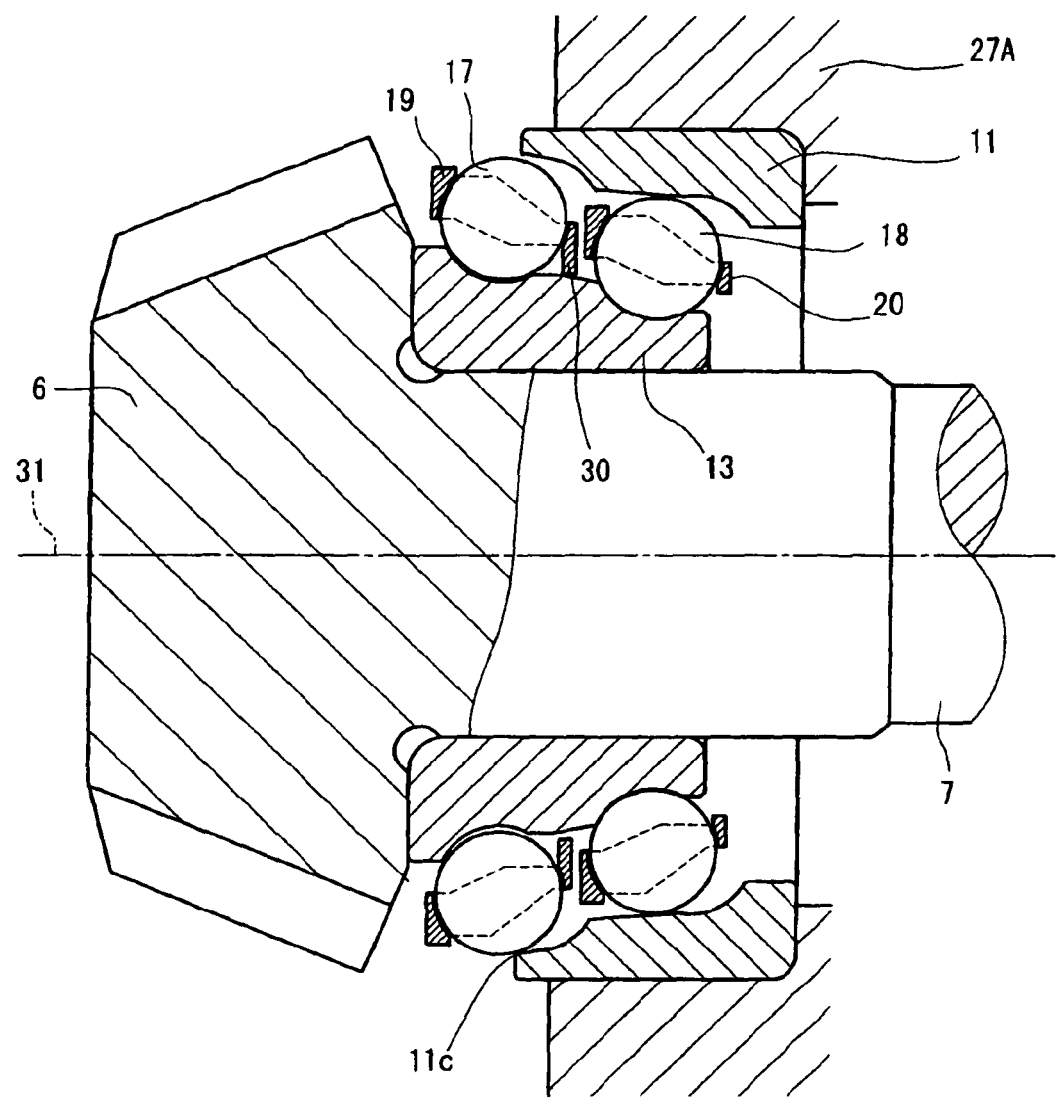
FIG. 4 is a cross-sectional view showing the process of mounting the inner ring assembly in the outer ring.

As a result, when the inner ring assembly 21 is inserted into the larger-diameter opening of the outer ring 11 as shown in FIG. 4, the vertically-lowermost end of the larger-diameter row 17 of rolling elements will not abut against the vertically-lower portion of the inner peripheral edge 11c of the larger-diameter opening of the outer ring 11, and can be mounted onto a larger-diameter raceway 11a of the outer ring 11. As a result, the inner ring assembly 21 can be mounted in the outer ring 11 as shown in FIG. 5. On the other hand, in the case where the drop limitation portion 30 is not provided, the distance from the axis 31 to the vertically-lowermost end of the larger-diameter row 17 of rolling elements does not satisfy the above formula, and therefore the vertically-lowermost end of the larger-diameter row 17 of rolling elements are brought into abutting engagement with the inner peripheral edge 11c of the larger-diameter opening of the outer ring 11 as described above for the conventional construction.

As described above, in this embodiment, the length of the drop limitation portion 30 formed at the inner peripheral portion of the larger-diameter cage 19 is so determined that when the inner ring assembly 21 is inserted into the larger-diameter opening of the outer ring 11, the vertically-lowermost end of the larger-diameter row 17 of rolling elements will not be brought into abutting engagement with the vertically-lower portion of the inner peripheral edge 11c of the larger-diameter opening of the outer ring 11. Therefore, the inner ring assembly 21 can be inserted into the larger-diameter opening of the outer ring 11 without causing the larger-diameter row 17 of rolling elements to abut against the inner peripheral edge 11c of the larger-diameter opening of the outer ring 11.

As a result, in this embodiment, the larger-diameter row 17 of rolling elements, as well as the smaller-diameter row 18 of rolling elements, will not be damaged by the inner peripheral edge 11c of the larger-diameter opening of the outer ring 11 during the above mounting operation. As a result, a large rolling sound will not be generated, and also a larger-diameter raceway 13a of the inner ring 13 will not be subjected to damage such as flaking, etc.

Here, the showing of the whole of a differential gear incorporating the double row rolling bearing of this embodiment therein is omitted. In the double row rolling bearing 10 incorporated in the differential gear, the drop limitation portion 30 of the larger-diameter cage 19 is held out of contact with the outer peripheral surface of the inner ring 13, and therefore this drop limitation portion 30 will not adversely affect the function of the differential gear.

Next, a method of mounting a preferred embodiment of a rolling bearing apparatus of the invention will be described with reference to FIGS. 6 to 10. An anti-pinion-gear-side double row rolling bearing 25 is a double row angular contact ball bearing, and comprises an outer ring 12 having a larger-diameter raceway 12a and a smaller-diameter raceway 12b which are arranged in two tow in the axial direction, an inner ring 14 having a larger-diameter raceway 14a and a smaller-diameter raceway 14b which are arranged in two rows in the axial direction and are opposed respectively to the larger-diameter raceway 12a and the smaller-diameter raceway 12b in the radial direction, a larger-diameter row 32 of rolling elements disposed between the larger-diameter raceways 12a and 14a, a smaller-diameter row 33 of rolling elements disposed between the smaller-diameter raceways 12b and 14b, a larger-diameter cage 34 holding the larger-diameter row 32 of rolling elements, and a smaller-diameter cage 35 holding the smaller-diameter row 33 of rolling elements.

In the double row rolling bearing 25, the inner ring 14, the rows 32 and 33 of rolling elements and the cages 34 and 35 are assembled together to form an inner ring assembly 23, and this inner ring assembly 23 is inserted into the outer ring 12 through a larger-diameter opening thereof to be mounted in the outer ring 12. In the double row rolling bearing 25, the inclinations of contact angles of the larger-diameter and smaller-diameter rows 32 and 33 of rolling elements for the respective raceways (12a and 14a) and (12b and 14b) are in the same direction.

Namely, the double row rolling bearings 10 and 25 are mounted in a back-to-back duplex manner, and a preload is applied to these bearings by a locating method. For applying this preload, a back face of the outer ring 11 of the double row rolling bearing 10 and a back face of the outer ring 12 of the double row rolling bearing 25 are caused to abut respectively against radially inwardly-directed step portions of annular walls 27A and 27B, and a back face of the inner ring 13 of the double row rolling bearing 10 is caused to abut against an inner end face of a pinion gear 6, and a back face of the inner ring 14 of the double row rolling bearing 25 is caused to abut against an inner end face of a companion flange 43, and further a spacer 7 is held between opposed front faces of the two inner rings 13 and 14 of the two rolling bearings 10 and 25, and in this condition a nut 49 is tightened, thereby setting the preload.

Figure 6:
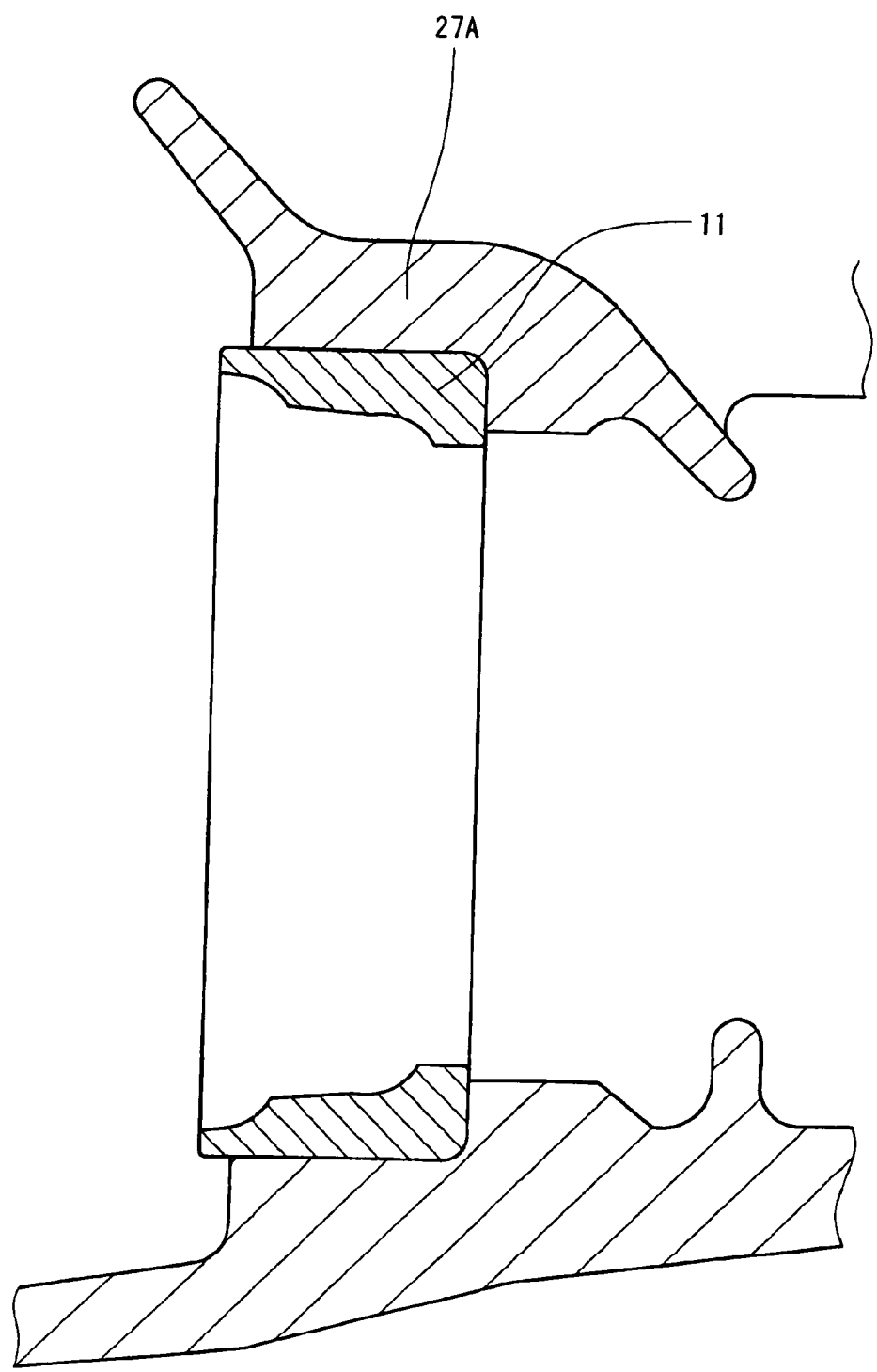
FIG. 6 is a view showing a step of a method of mounting a preferred embodiment of a rolling bearing apparatus of the invention.

First, as shown in FIG. 6, the outer ring (pinion gear-side outer ring) 11 of the pinion gear-side double row rolling bearing 10 is fixed to the annular wall 27A (pinion gear-side inner peripheral surface of the case) with its larger-diameter opening directed toward the pinion gear 6 (First Step).

Figure 7:
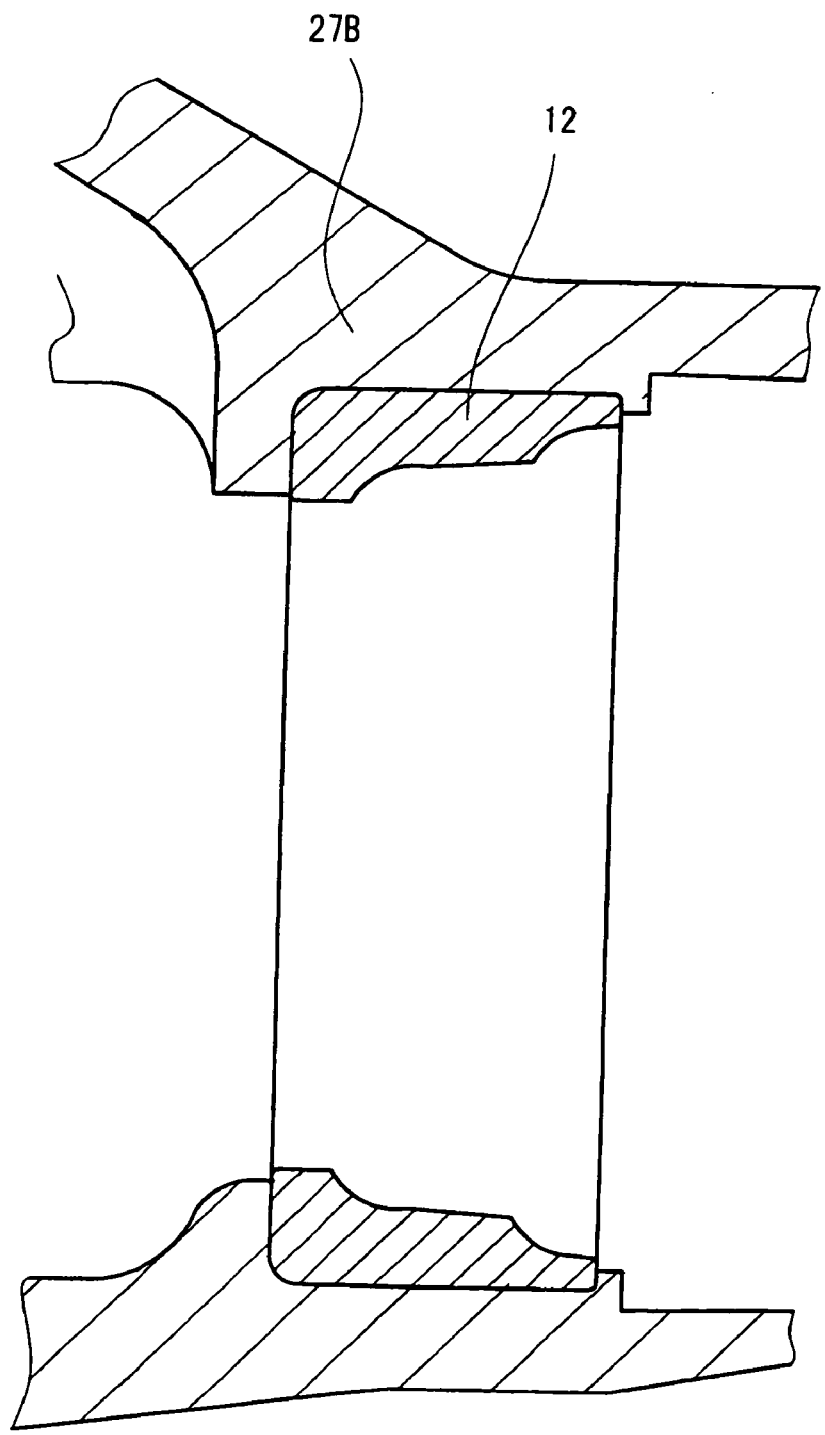
FIG. 7 is a view showing the next step of the method of mounting the rolling bearing apparatus of the embodiment.

Then, as shown in FIG. 7, the outer ring (anti-pinion-gear-side outer ring) 12 of the anti-pinion-gear-side double row rolling bearing 25 is fixed to the annular wall 27B (anti-pinion-gear-side inner peripheral surface of the case) with its larger-diameter opening directed away from the pinion gear 6 (Second Step).

Figure 8:
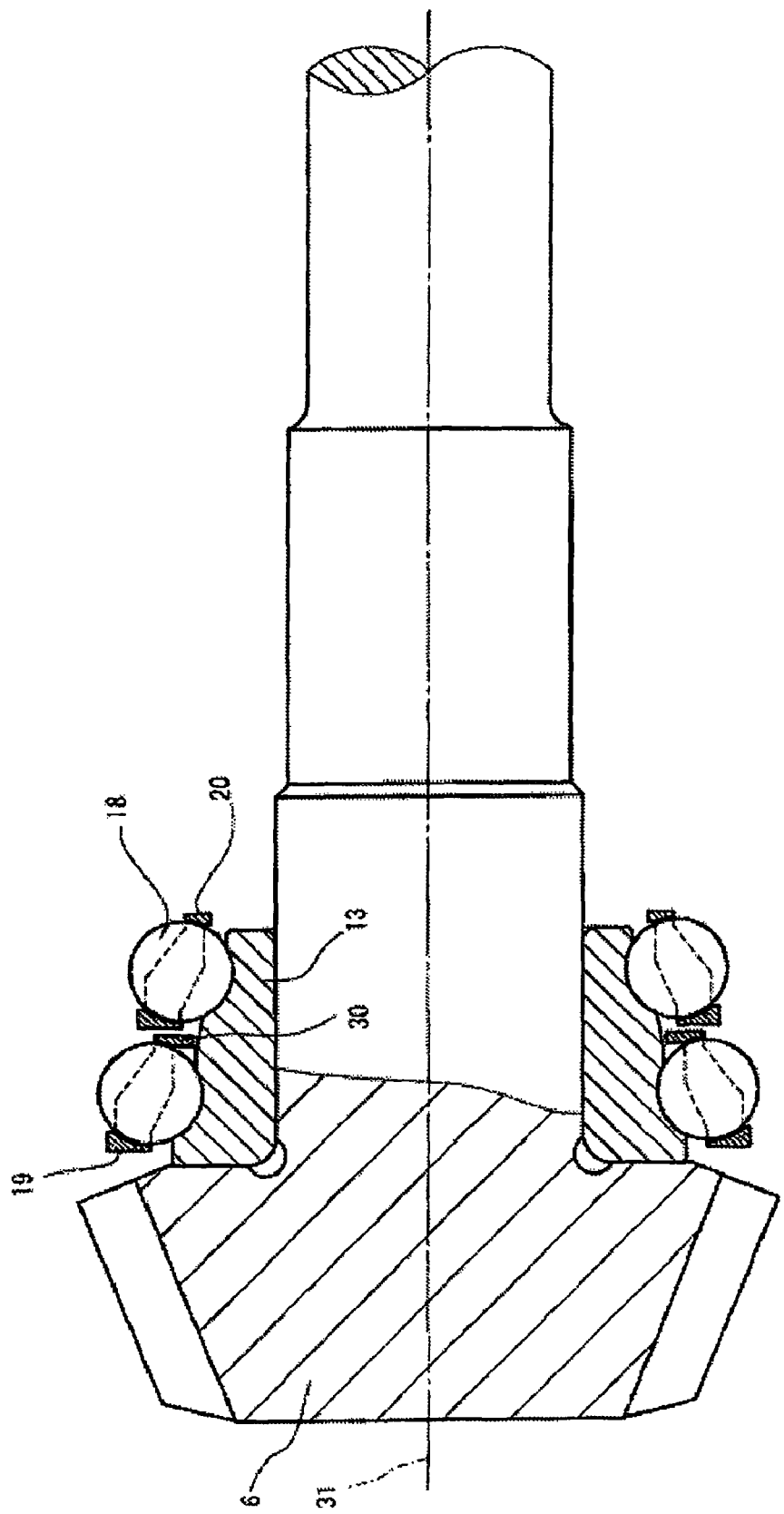
FIG. 8 is a view showing the next step of the method of mounting the rolling bearing apparatus of the embodiment.

Then, as shown in FIG. 8, the inner ring assembly (pinion gear-side inner ring assembly) 21 of the pinion gear-side double row rolling bearing 10 is fitted on a pinion gear-side portion of the pinion shaft 7 with the smaller-diameter end of the inner ring 13 directed toward the larger-diameter opening of the pinion gear-side outer ring 11 (Third Step, see. FIG. 3).

Figure 5:
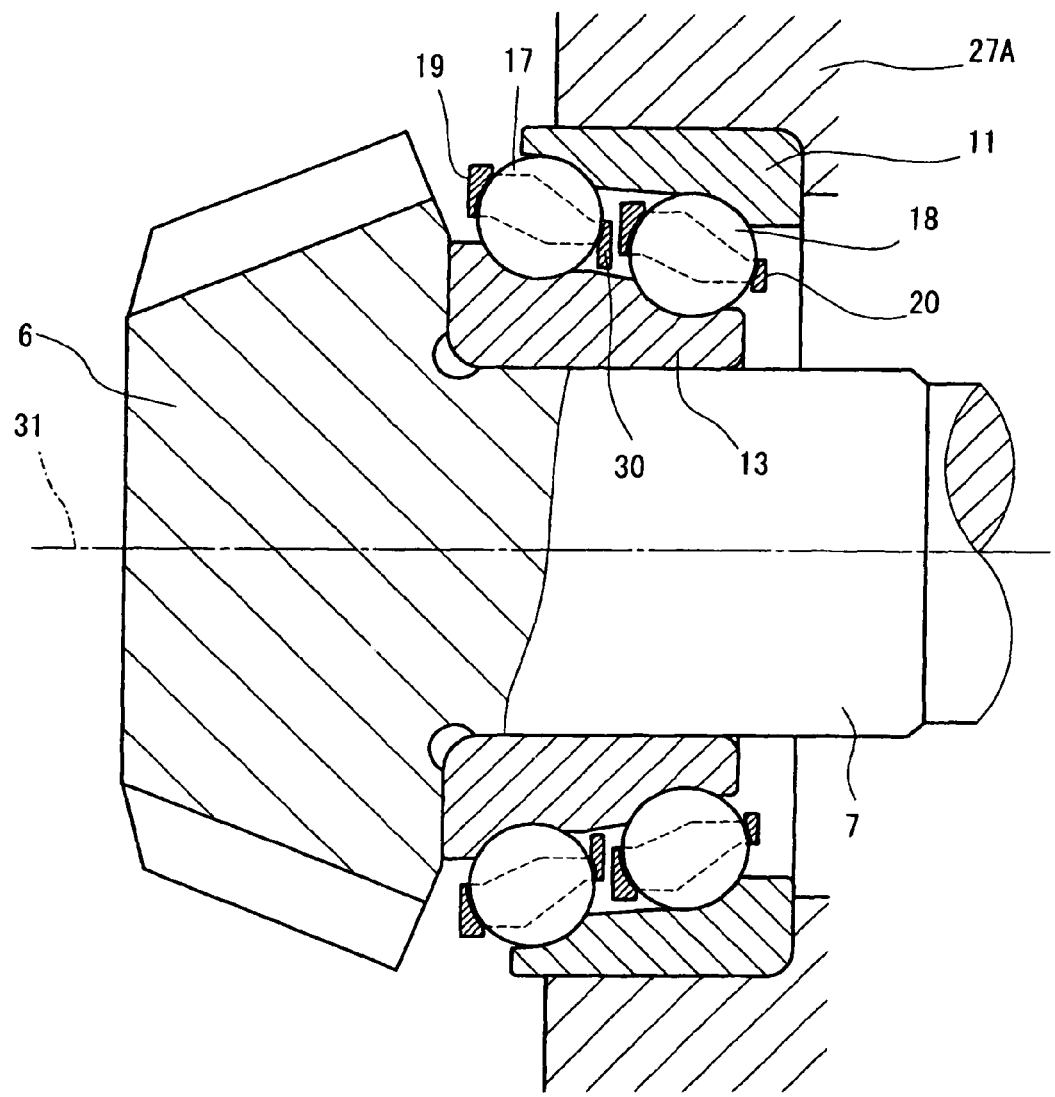
FIG. 5 is a cross-sectional view showing a condition in which the inner ring assembly is mounted in the outer ring.
Figure 9:
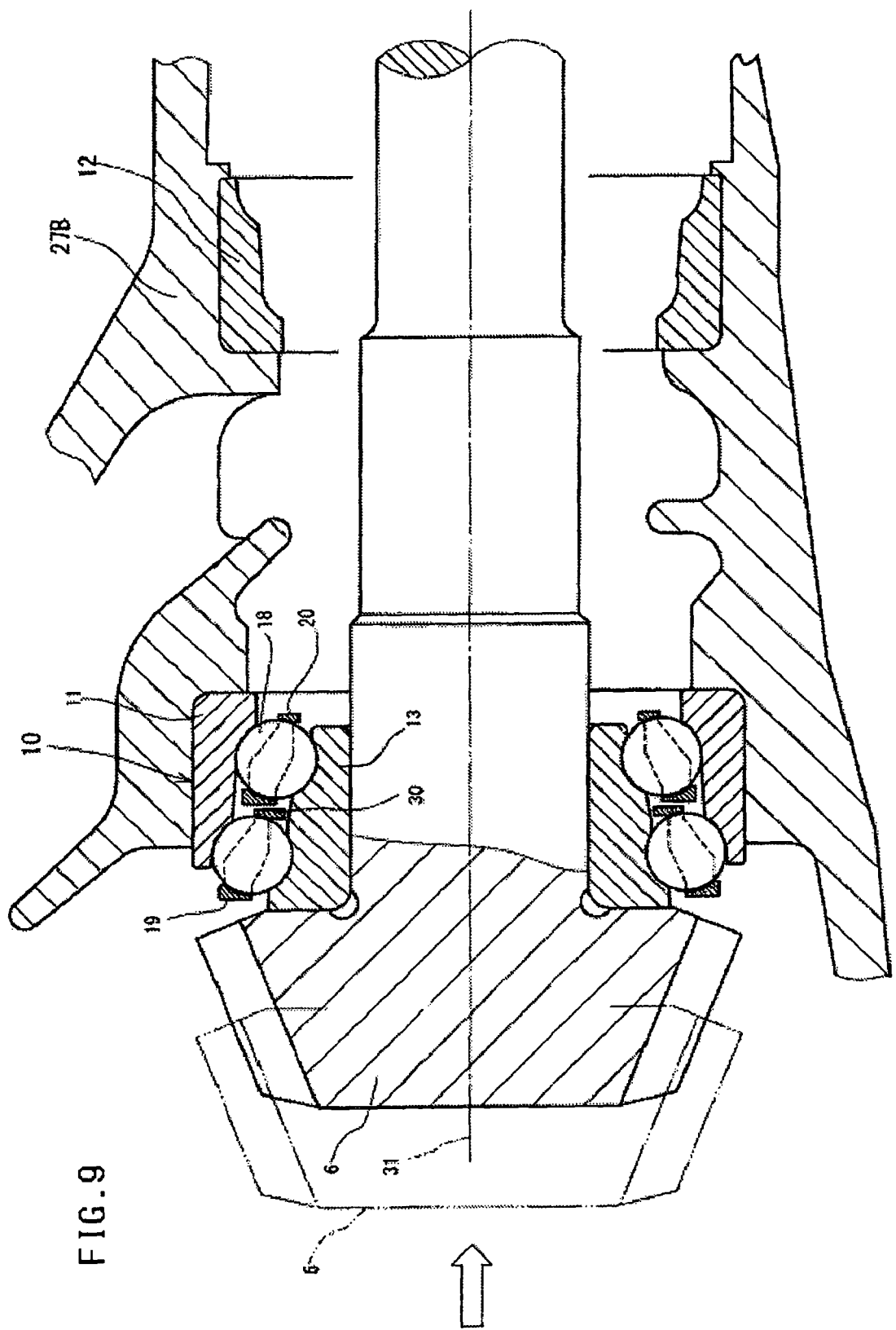
FIG. 9 is a view showing the next step of the method of mounting the rolling bearing apparatus of the embodiment.

Then, as shown in FIG. 9, the pinion shaft 7 is passed through the pinion gear-side outer ring 11 from the pinion gear-side, and is further passed through the anti-pinion-gear-side outer ring 12, thereby mounting the pinion gear-side inner ring 13 in the pinion gear-side outer ring 11 (Fourth Step, see FIGS. 4 and 5).

Figure 10:
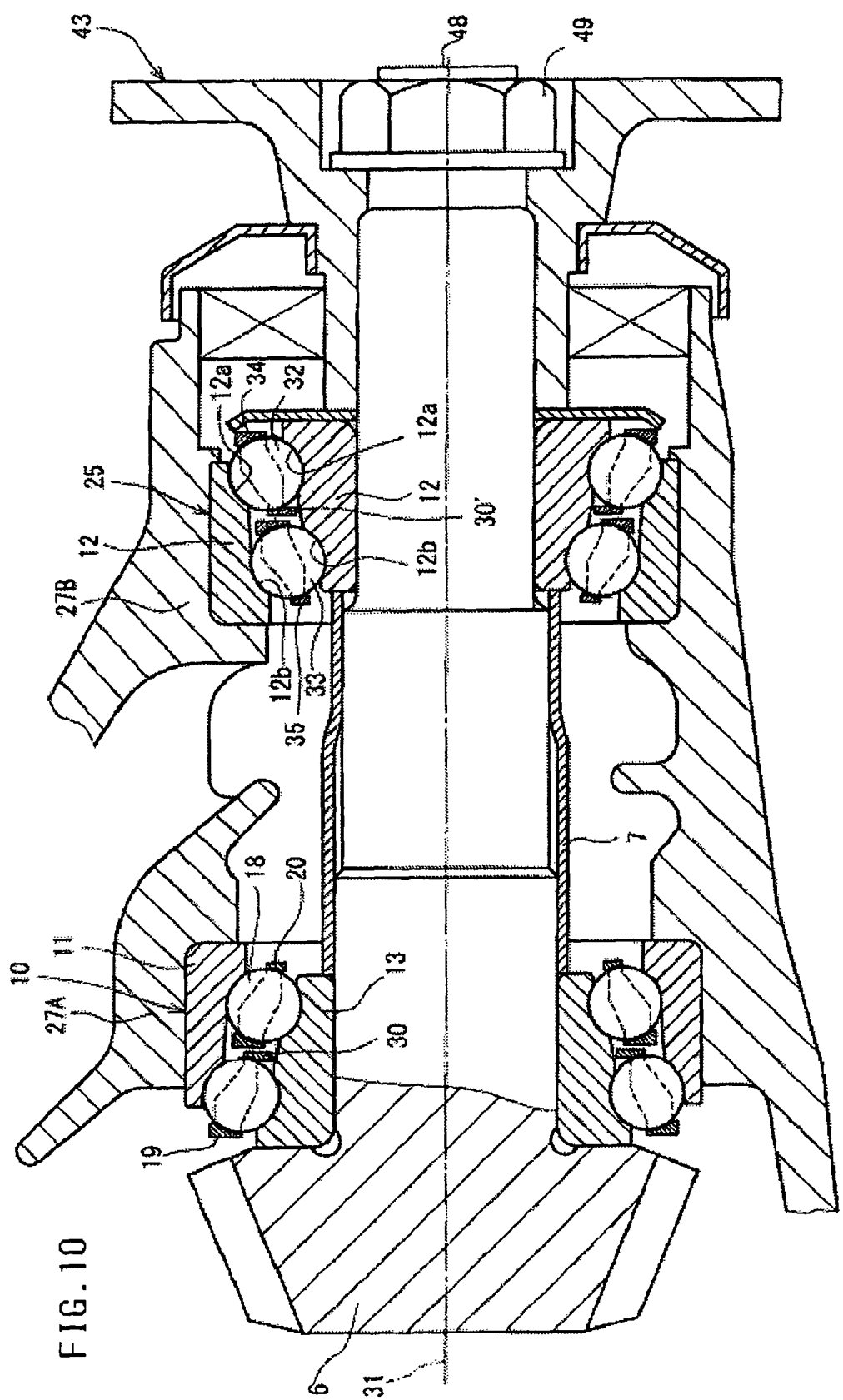
FIG. 10 a view showing a final step of the method of mounting the rolling bearing apparatus of the embodiment.
Figure 11:
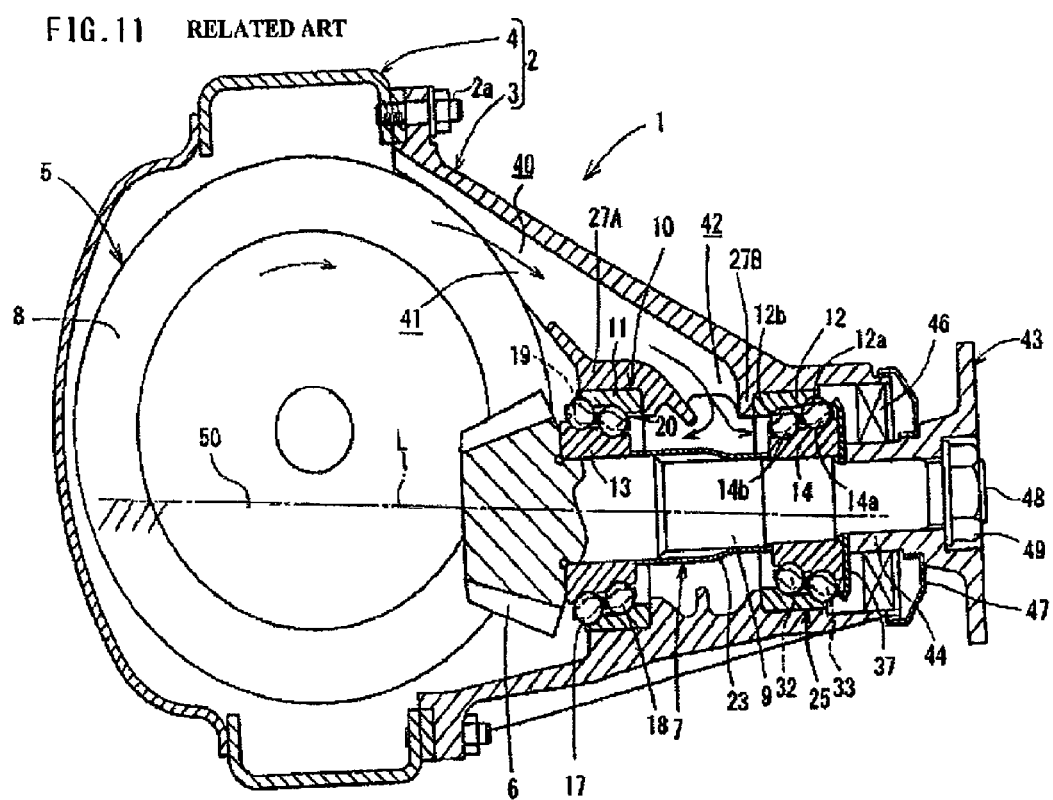
FIG. 11 is a cross-sectional view of a differential gear incorporating conventional double row rolling bearings therein.
Figure 12:
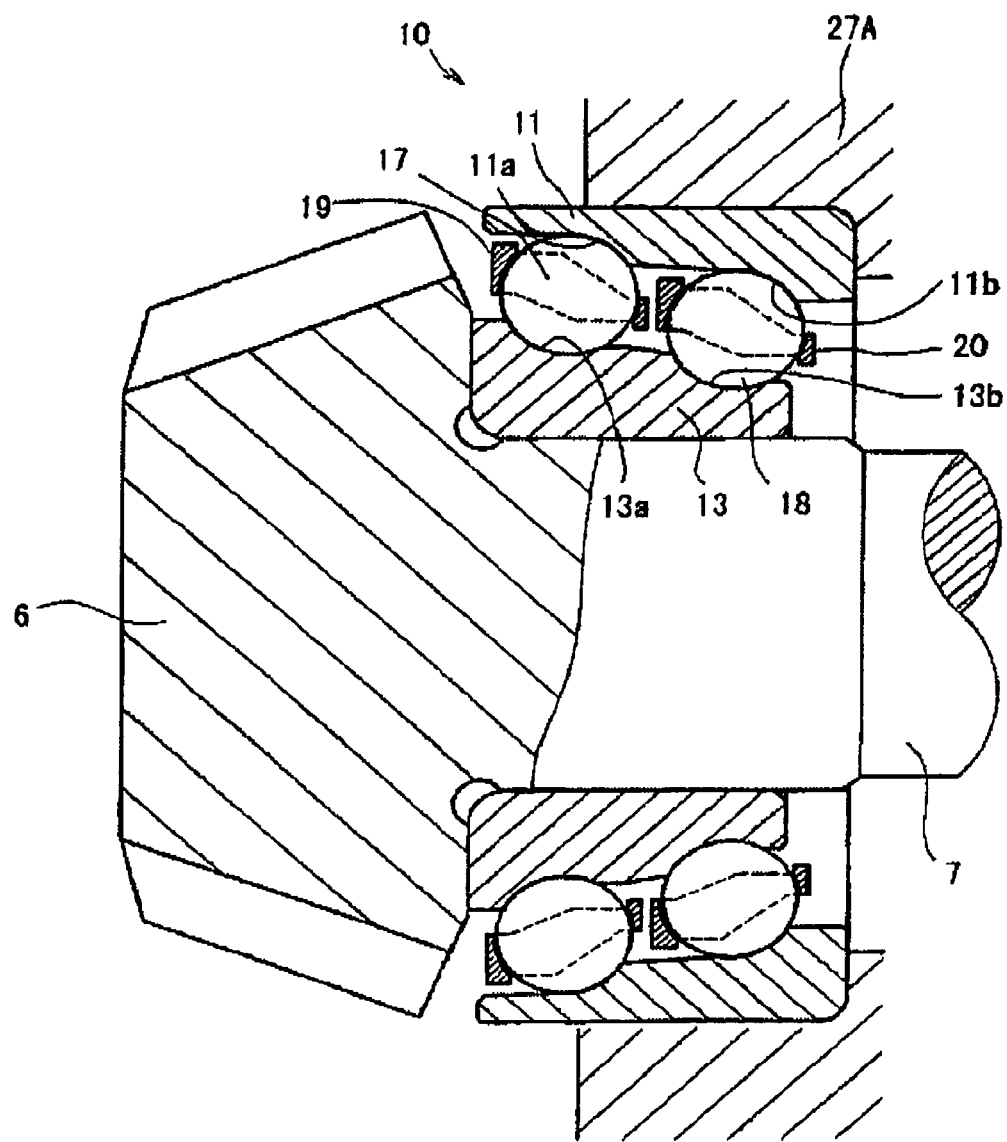
FIG. 12 is a cross-sectional view of the conventional double row rolling bearing.
Figure 13:
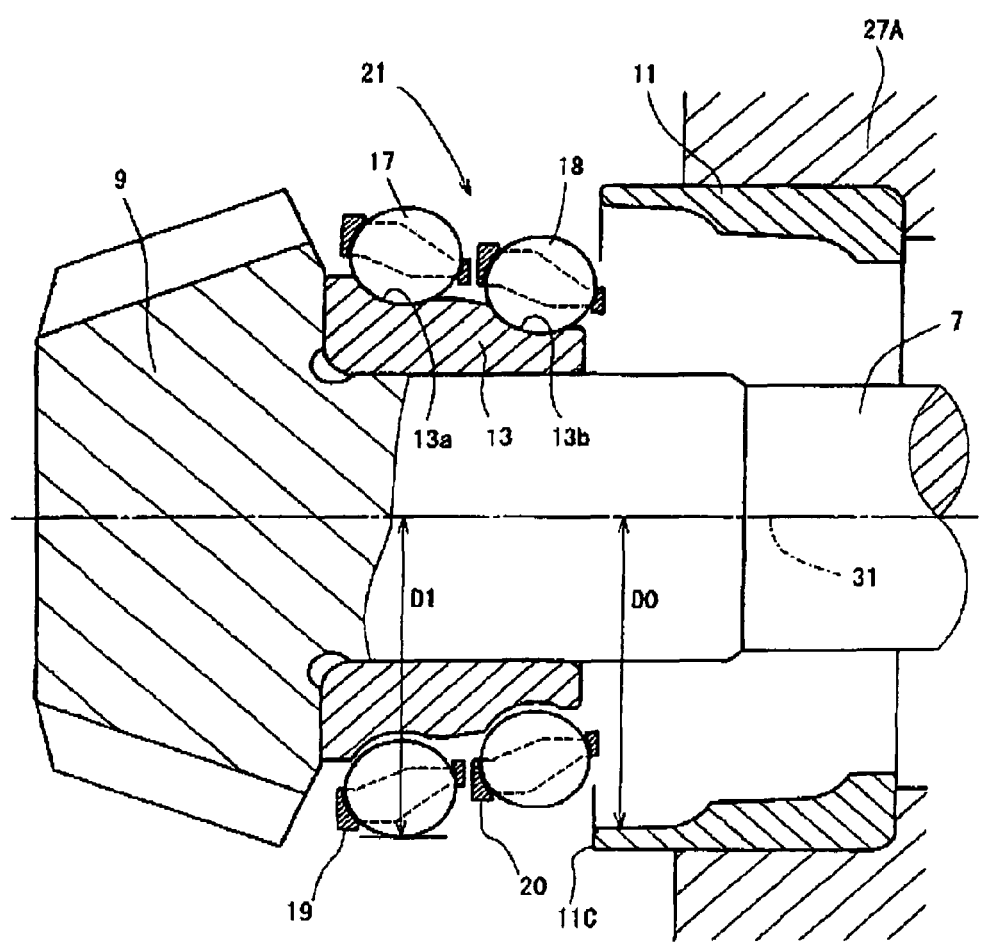
FIG. 13 is a cross-sectional view showing a condition before an inner ring assembly is mounted in an outer ring.
Figure 14:
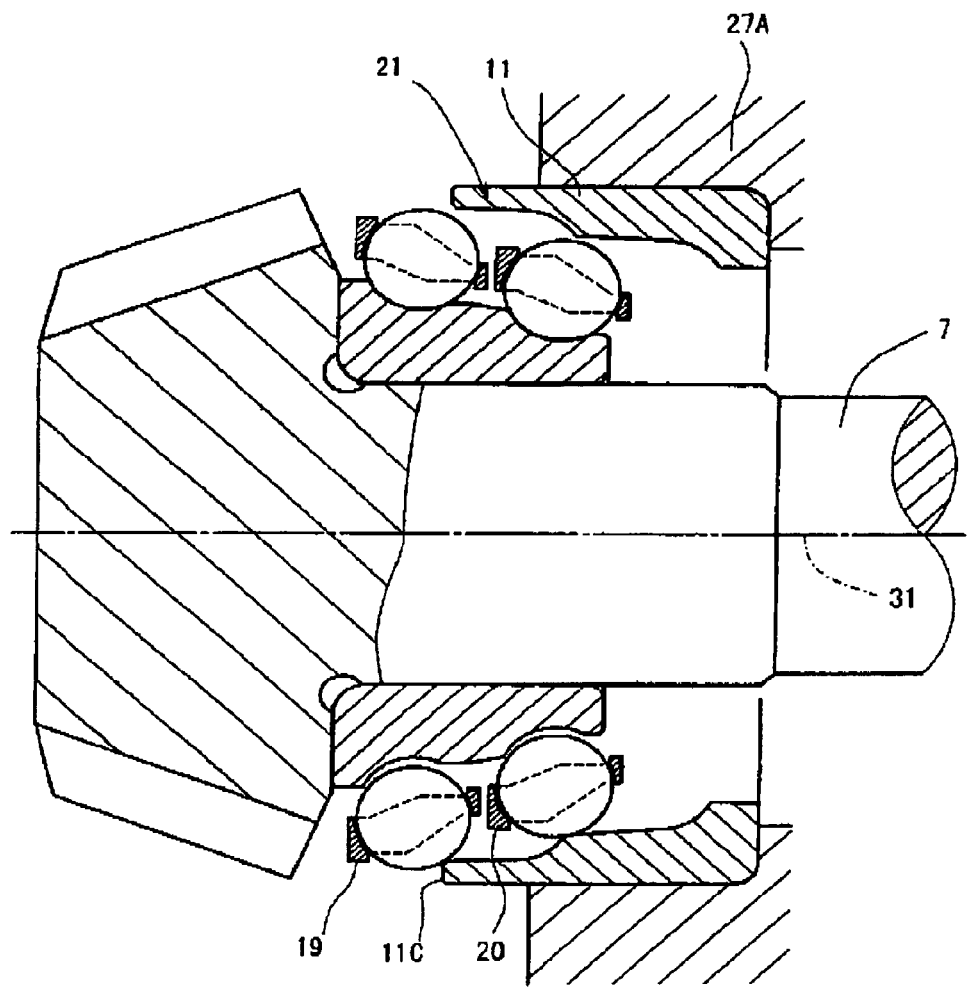
FIG. 14 is a cross-sectional view showing the process of mounting the inner ring assembly in the outer ring.

Finally, as shown in FIG. 10, the inner ring assembly (anti-pinion-gear-side inner ring assembly) 23 of the anti-pinion-gear-side double row rolling bearing 25 is mounted in the anti-pinion-gear-side outer ring 12 from the anti-pinion-gear side of the pinion shaft 7 (Fifth Step).

Thus, the mounting of the rolling bearing apparatus of this embodiment in the differential gear is completed.

The invention claimed is:

1. A double row rolling bearing for supporting a pinion shaft, comprising:
   an outer ring that includes a larger-diameter raceway and a smaller-diameter raceway which are formed in two rows on an inner peripheral surface thereof; and
   an inner ring assembly that includes:
      an inner ring that includes a larger-diameter raceway and a smaller-diameter raceway which are formed in two rows on an outer peripheral surface thereof and are opposed respectively to the larger-diameter and smaller-diameter raceways of the outer ring in a radial direction;
      a larger-diameter row of rolling elements disposed between the larger-diameter raceways of the outer and inner raceways;
      a smaller-diameter row of rolling elements disposed between the smaller-diameter raceways of the outer and inner raceways;
      a larger-diameter cage that holds the larger diameter row of rolling elements and includes a flange-like drop limitation portion extending radially inwardly from an axially-inner end portion thereof; and
      a smaller-diameter cage that holds the smaller-diameter row of rolling elements,
   wherein the drop limitation portion is configured such that when the rolling bearing is being assembled, the outer ring is fixed to an inner peripheral surface of a case with an axis there of being disposed horizontally, and the inner ring assembly fitted on the pinion shaft is inserted horizontally into the outer ring through a larger-diameter opening of the outer ring to be mounted in the outer ring while the drop limitation portion prevents the larger-diameter row of rolling elements from dropping in an amount exceeding a predetermined value and, when larger-diameter row of rolling elements is disposed between the larger-diameter raceways of the outer and inner raceways a gap is provided between the drop limitation portion and the inner ring.

2. A rolling bearing apparatus comprising:
   a case;
   a pinion shaft that is provided with a pinion gear fixed to a free end portion thereof and is supported on an inner peripheral surface of the case;
   a first rolling bearing according to claim 1 disposed at a pinion gear-side portion of the pinion shaft for supporting the pinion shaft on the case; and
   a second rolling bearing disposed at a pinion-gear-opposite side portion of the pinion shaft which is spaced from the pinion gear-side portion in an axial direction thereof for supporting the pinion shaft on the case,
   wherein when the rolling bearing apparatus is assembled, the outer ring of the first rolling bearing is fixed to an inner peripheral surface of the case with a larger-diameter opening being directed toward the pinion gear, and the inner ring assembly of the first rolling bearing is inserted into the outer ring through the larger-diameter opening to be mounted in the outer ring while an inner peripheral surface of a vertically-upper portion of the drop limitation portion abuts against the outer peripheral surface of the inner ring.

3. The rolling bearing apparatus according to claim 2, wherein the case is provided at a differential gear or a transfer apparatus of an automobile.

4. A double row rolling bearing apparatus according to claim 2, wherein, the drop limitation portion is configured so as to satisfy the $D1 \leq D0$, where $D1$ a distance from the axis of the outer ring to a vertically-lowermost end of the larger-diameter row of rolling elements and $D0$ is a distance from the axis of the outer ring to a vertically-lower portion of an inner peripheral edge of the larger-diameter opening of the outer ring.

5. A rolling bearing apparatus comprising:
   a case;
   a pinion shaft that is provided with a pinion gear fixed to a free end portion thereof and is supported on an inner peripheral surface of the case;
   a first rolling bearing disposed at a pinion gear-side portion of the pinion shaft for supporting the pinion shaft on the case; and
   a second rolling bearing according to claim 1 disposed at a pinion-gear-opposite side portion of the pinion shaft which is spaced from the pinion gear-side portion in an axial direction thereof for supporting the pinion shaft on the case,
   wherein when the rolling bearing apparatus is assembled, the outer ring of the second rolling bearing is fixed to an inner peripheral surface of the case with a larger-diameter opening there of being directed away from the pinion gear, and the inner ring assembly of the second rolling bearing is inserted into the outer ring through the larger-diameter opening thereof to be mounted in the outer ring while an inner peripheral surface of a vertically-upper portion of the drop limitation portion abuts against the outer peripheral surface of the inner ring.

6. The rolling bearing apparatus according to claim 5, wherein the case is provided at a differential gear or a transfer apparatus of an automobile.

7. A double row rolling bearing apparatus according to claim 5, wherein, the drop limitation portion is configured so as to satisfy the $D1 \leq D0$, where $D1$ a distance from the axis of the outer ring to a vertically-lowermost end of the larger-diameter row, of rolling elements and $D0$ is a distance from the axis of the outer ring to a vertically-lower portion of an inner peripheral edge of the larger-diameter opening of the outer ring.

8. A double row rolling bearing according to claim 1, wherein, when the larger-diameter row of rolling elements is disposed between the larger-diameter raceways of the outer and inner raceways, the drop limitation portion is out of contact with the inner ring.

9. A double row rolling bearing according to claim 1, wherein the gap is formed, in the radial direction, between a radially innermost portion of the drop limitation portion and the inner ring.

10. A double row rolling bearing according to claim 1, wherein an entirety of the drop limitation portion is disposed radially outward from a portion of the outer peripheral surface of the inner ring disposed opposite, in the radial direction, the drop limitation portion.

11. A double row rolling bearing according to claim 1, wherein, when rolling bearing is fully assembled, the drop limitation portion is out of contact with the inner ring.

12. A method of assembling a rolling bearing apparatus, comprising:

providing a ease, a pinion shaft provided with a pinion gear fixed to a free end portion thereof, and first and second rolling bearing according to claim 5 disposed respectively on a pinion-gear-side portion and a pinion-gear-opposite side portion of the case which are spaced from each other in an axial direction thereof for supporting the pinion shaft on the case;

a first step of fixing the outer ring of the first rolling bearing to an inner peripheral surface of the pinion gear-side portion with a larger-diameter opening thereof being directed toward the pinion gear;

a second step of fixing the outer ring of the second rolling bearing to an inner peripheral surface of the pinion-gear-opposite side portion with a larger-diameter opening thereof being directed away from the pinion gear;

a third step of fitting the inner ring assembly of the first rolling bearing on the pinion-gear-side portion of the pinion shaft with a smaller-diameter portion of the inner ring being directed toward the larger-diameter opening of the pinion gear-side outer ring while an inner peripheral surface of a vertically-upper portion of the drop limitation portion of the first rolling bearing abuts against the outer peripheral surface of the inner ring;

a fourth step of passing the pinion shaft through the outer ring of the first rolling bearing from the pinion gear side and further passing the pinion shaft through the outer ring of the second rolling bearing to mount the inner ring assembly of the first rolling bearing in the outer ring of the first rolling bearing; and a fifth step of mounting the inner ring assembly of the second rolling bearing in the outer ring of the second rolling bearing from the pinion-gear-opposite side while an inner peripheral surface of a vertically-upper portion of the drop limitation portion of the second rolling bearing abuts against the outer peripheral surface of the inner ring, wherein after the first and second steps are carried out in any order, the third to fifth steps are sequentially carried out.

* * * * *